(12) United States Patent
Curhan et al.

(10) Patent No.: US 11,072,080 B2
(45) Date of Patent: *Jul. 27, 2021

(54) END OF ARM TOOLS FOR SOFT ROBOTIC SYSTEMS

(71) Applicant: Soft Robotics, Inc., Bedford, MA (US)

(72) Inventors: Jeffrey Curhan, Warwick, RI (US);
Craig Demello, Newfields, NH (US);
Thomas Womersley, Newton, MA (US); William Gunner, Quincy, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,092

(22) Filed: Dec. 19, 2019

(65) Prior Publication Data

US 2020/0156266 A1    May 21, 2020

Related U.S. Application Data

(63) Continuation-in-part of application No. 16/189,656, filed on Nov. 13, 2018, now Pat. No. 10,518,423.

(Continued)

(51) Int. Cl.
*B25J 15/12* (2006.01)
*B25J 13/08* (2006.01)
*B25J 15/00* (2006.01)

(52) U.S. Cl.
CPC ............ *B25J 15/12* (2013.01); *B25J 13/086* (2013.01); *B25J 15/0023* (2013.01)

(58) Field of Classification Search
CPC .... B25J 15/0023; B25J 15/12; B25J 15/0658; B25J 9/142; B25J 13/086; B25J 13/089; B25J 19/0058
See application file for complete search history.

(56) References Cited

U.S. PATENT DOCUMENTS 2,995,057 A    8/1961  Nenzell
3,343,864 A *  9/1967  Baer ................... B25J 15/0023
                                                  294/119.3

(Continued)

FOREIGN PATENT DOCUMENTS

EP    0534778 A2    3/1993
JP    2004181585 A  7/2004
WO    2015191585 A1 12/2015

OTHER PUBLICATIONS

International Search Report and Written Opinion for International application No. PCT/US18/55887, dated Jan. 30, 2019, 12 pages.

*Primary Examiner* — Dean J Kramer
(74) *Attorney, Agent, or Firm* — Kacvinsky Daisak Bluni PLLC

(57) ABSTRACT

Exemplary embodiments relate to unique structures for robotic end-of-arm-tools (EOATs). In particular, exemplary embodiments provide structures allowing a displacement fluid to be discharged from a distal end of a robotic finger. The discharge may be used to displace a target object, such as an object that is adjacent to another blocking object or the side of a container. After the target object is displaced, the EOAT may be better able to maneuver into a gripping posture and may be able to secure a better grasp on the target object.

18 Claims, 12 Drawing Sheets

Related U.S. Application Data

(60) Provisional application No. 62/584,399, filed on Nov. 10, 2017.

(56) References Cited

U.S. PATENT DOCUMENTS

| | | | |
|---|---|---|---|
| 3,601,442 A * | 8/1971 | Orndorff | B66C 1/46 294/119.3 |
| 3,640,564 A * | 2/1972 | Kuster | F16C 1/10 294/119.3 |
| 3,803,972 A | 4/1974 | Deutsher | |
| 3,981,528 A * | 9/1976 | Andorf | B25J 15/0023 294/119.3 |
| 4,312,616 A | 1/1982 | Waller et al. | |
| 4,403,801 A | 9/1983 | Huff et al. | |
| 4,460,826 A * | 7/1984 | Pryor | B25J 19/025 250/227.2 |
| 4,502,721 A * | 3/1985 | Savin-Czeizler | B25J 15/06 294/64.3 |
| 4,749,321 A | 6/1988 | Knohl et al. | |
| 4,875,818 A | 10/1989 | Reinwall | |
| 5,006,026 A | 4/1991 | Estrada | |
| 5,066,058 A * | 11/1991 | Guyard | B25J 15/06 294/64.3 |
| 5,102,292 A * | 4/1992 | Brinker | B65G 61/00 414/796 |
| 5,201,625 A | 4/1993 | Takenouchi et al. | |
| 5,228,867 A | 7/1993 | Nagamine | |
| 5,271,689 A | 12/1993 | Ishii et al. | |
| 6,017,177 A | 1/2000 | Lanham | |
| 6,046,177 A * | 4/2000 | Stella | A61K 47/6951 514/58 |
| 6,244,807 B1 * | 6/2001 | Garcia | F16B 33/004 411/369 |
| 6,345,818 B1 * | 2/2002 | Stephan | B25J 15/0616 271/91 |
| 6,789,989 B2 | 9/2004 | Walther | |
| 9,048,572 B2 | 6/2015 | Shibata | |
| 10,518,423 B2 * | 12/2019 | Curhan | B25J 13/081 |
| 10,569,422 B2 | 2/2020 | Curhan et al. | |
| 10,578,145 B2 | 3/2020 | Fujihara et al. | |
| 2003/0094769 A1 | 5/2003 | Tyroller | |
| 2006/0033350 A1 | 2/2006 | Besch | |
| 2010/0047033 A1 | 2/2010 | Baumgartner et al. | |
| 2010/0143074 A1 | 6/2010 | Sumiya et al. | |
| 2010/0217436 A1 | 8/2010 | Jones et al. | |
| 2013/0089388 A1 | 4/2013 | Liu et al. | |
| 2016/0075036 A1 * | 3/2016 | Lessing | B25J 15/0023 361/234 |
| 2016/0114482 A1 * | 4/2016 | Lessing | B25J 15/083 606/130 |
| 2016/0131178 A1 | 5/2016 | Shiba | |
| 2017/0173800 A1 * | 6/2017 | Genefke | B25J 15/0014 |
| 2017/0203443 A1 * | 7/2017 | Lessing | B25J 9/0027 |
| 2017/0291806 A1 * | 10/2017 | Lessing | B25J 9/1612 |
| 2017/0369149 A1 | 12/2017 | Walker et al. | |

* cited by examiner

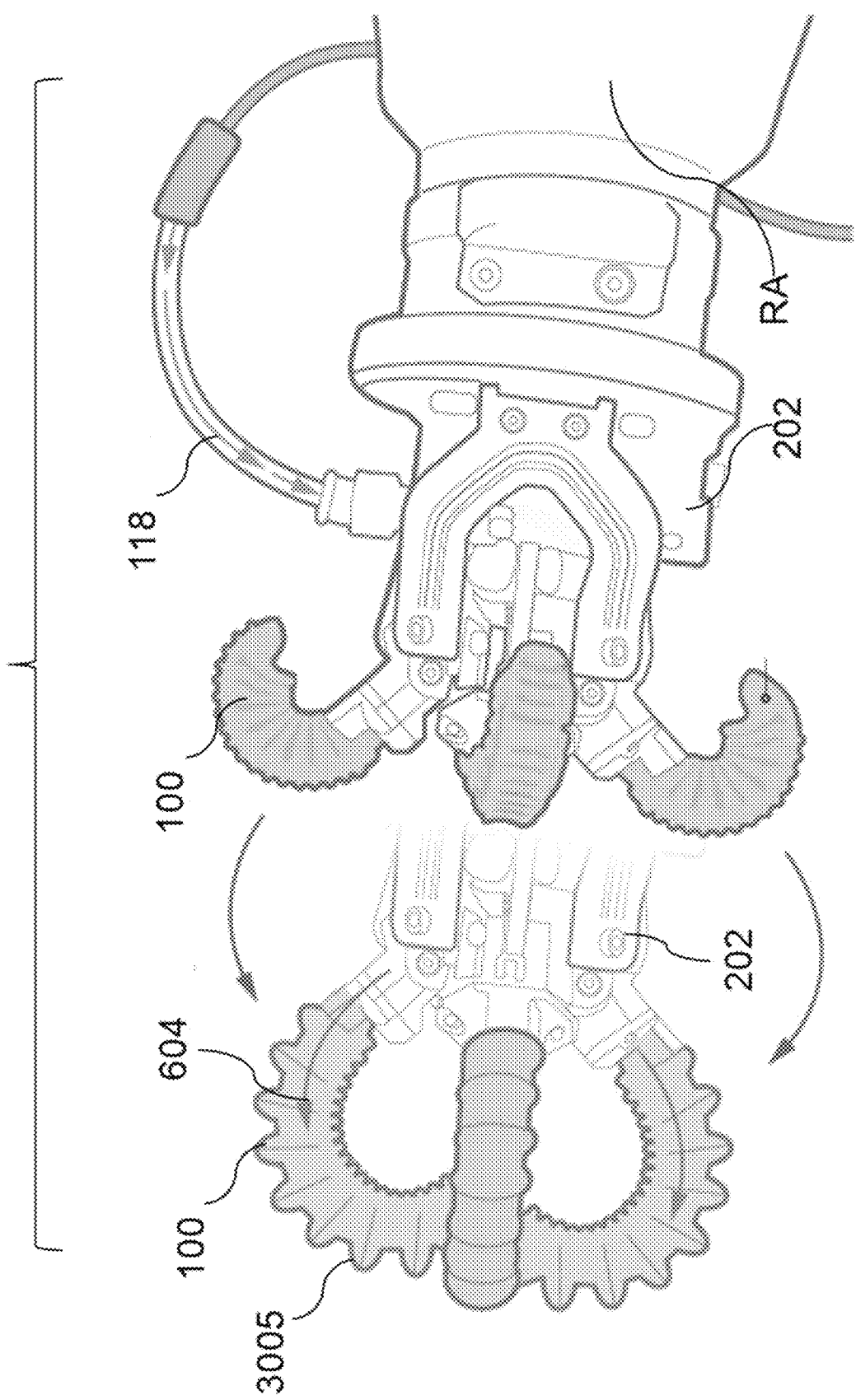

END OF ARM TOOLS FOR SOFT ROBOTIC SYSTEMS

RELATED APPLICATIONS

This application is a Continuation Application of U.S. application Ser. No. 16/189,656, filed Nov. 13, 2018, which claims priority to U.S. Provisional Patent Application Ser. No. 62/584,399, filed on Nov. 10, 2017. The contents of the aforementioned application are incorporated herein by reference.

FIELD OF THE DISCLOSURE

The disclosure relates generally to the field of robotics and particularly to novel structures robotic end-of-arm tools.

BACKGROUND

Robotic graspers are increasingly used to automate the retrieval of items from a warehouse. Typically, a warehouse includes many shelves, each containing a number of bins or totes storing items (e.g., items offered for sale). When an order for items is received, the appropriate items are retrieved from the bins or totes and packaged together for shipment.

Due to the size and shape of the totes or bins, the size, weight, and shape of items in the totes or bins, the variability in size, weight, and shape of items in the totes or bins and due to the relatively tight storage constraints in a warehouse or an individual tote or bin, retrieving an item from one of the totes or bins may be difficult for conventional robotic systems. Often, robotic arms include bulky components, or systems extending laterally from the body of the robotic arm, which make it difficult to navigate confined spaces.

SUMMARY

Exemplary embodiments relate to apparatuses and methods for providing soft robotic grasping systems for grasping a target article. The system may include an outlet located at the tip of the robotic finger for discharging a displacement fluid so as to displace a target object. This may place the target object into a better position for grasping (by moving the target object away from nearby blocking objects and/or the sides of a container).

The soft robotic grasping system may include a soft robotic end effector. The end effector may include a gripper hub and a soft robotic finger supported by the hub.

The soft robotic finger may include an elastomeric outer surface surrounding an internal void. The soft robotic finger may be configured to curl when a pressure change occurs within the internal void.

The soft robotic finger may include an inlet at its proximal end and an outlet at its distal end. A channel may connect the inlet to the outlet. A displacement fluid (such as compressed air supplied by a compressor) may be supplied to the inlet, may pass through the channel, and may be discharged from the outlet. The displacement fluid may be the same as, or different from, an inflation fluid used to induce the pressure change in the internal void of the soft robotic finger.

The end effector may include a sensor (e.g., a camera, an infrared distance detector, LIDAR, RADAR, etc.) configured to detect when a target object is located in close proximity to a blocking object.

The end effector may further include a controller configured to provide a displacement fluid to the inlet to cause a discharge of the displacement fluid through the outlet. The controller may be configured to approach the target object based on an output of the sensor and apply the discharge of the displacement fluid to displace the target object.

In some embodiments, the end effector may include a strain limiting layer on a radially inner surface of the soft robotic finger. The strain limiting layer may include rigid slats which cause or assist in the curling motion. The channel may be embedded in the strain limiting layer. Alternatively or in addition, the channel may be embedded in the elastomeric outer surface of the soft robotic finger.

In some embodiments, the pressure in the channel may be measured and may be used as a proximity detector that identifies when the distal end of the soft robotic finger approaches or makes contact with a target object. For example, the outlet may be porous, and the controller may be configured to measure a pressure in the air channel and identify that a distal end of the soft robotic finger is in proximity to a target object based on a change in the pressure.

In some embodiments, the gripper hub may be (or may include) a manifold having a first fluid flow path for supplying an inflation fluid to the soft robotic finger, and a second fluid flow path for supplying the displacement fluid to the inlet. A barbed connector on the manifold may be configured to mate with the inlet in the finger to secure the manifold to the inlet. The displacement fluid may be supplied through the inlet.

Furthermore, the manifold may include a flange configured to capture and secure the soft robotic finger. The flange may surround the first fluid flow path and may secure the finger to the manifold in a configuration that connects the first fluid flow path to the internal void of the soft robotic finger.

The above-described end effector may be used in a grasping method, in which the displacement fluid is used to displace the target object and then the end effector may grasp the target object.

Further embodiments, which may be used separately or together with the above-described end effector, may further include an outer porous surface on the end effector. The outer porous surface may be connected to the above-described inlet, or another inlet, and may be configured to provide a lubrication fluid to the outer surface of the finger. For instance, the controller may cause the lubrication fluid to be expelled through the porous surface.

BRIEF DESCRIPTION OF THE DRAWINGS

FIGS. 1A-1G depict various examples of soft robotic actuators.

DETAILED DESCRIPTION OF THE PREFERRED EMBODIMENTS

Figure 1A:
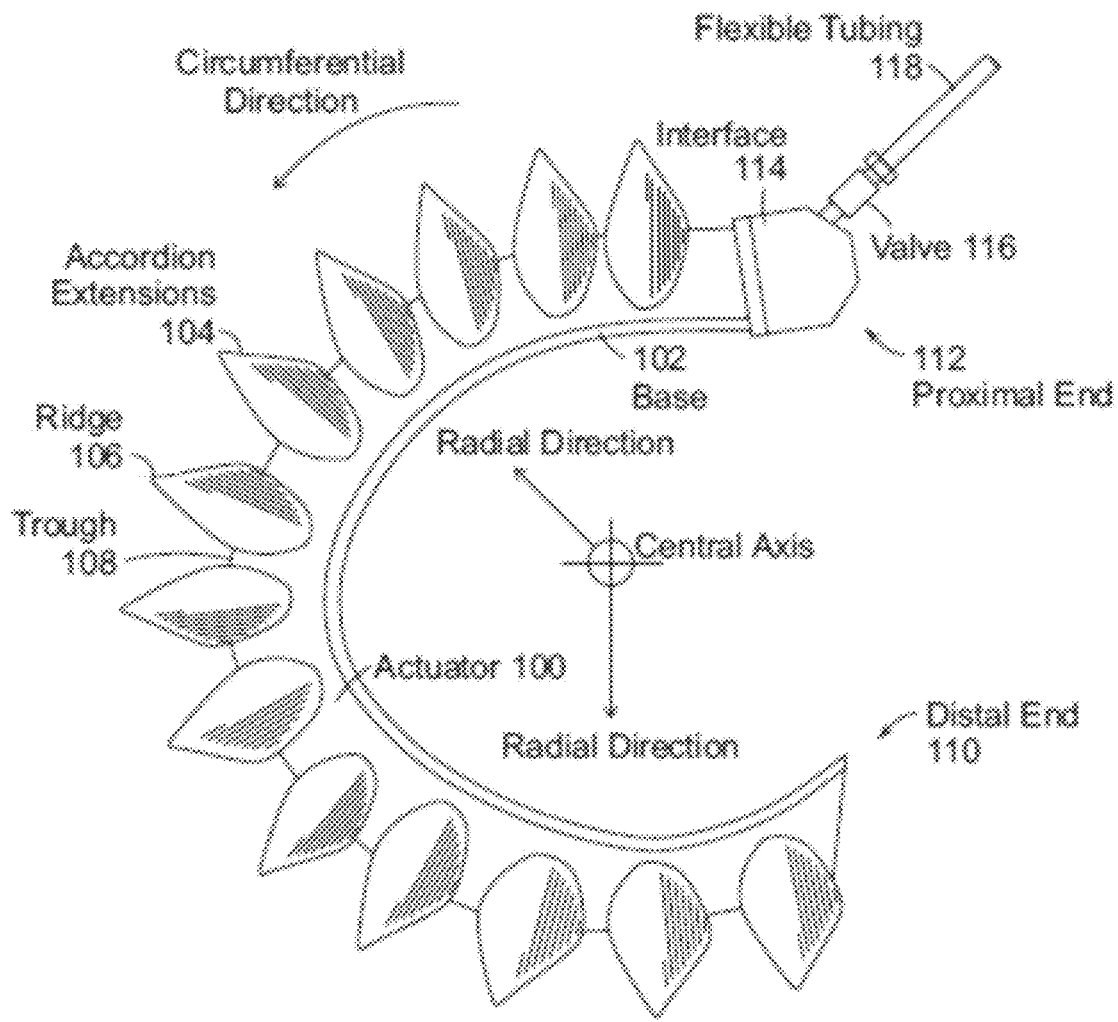

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing.

With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
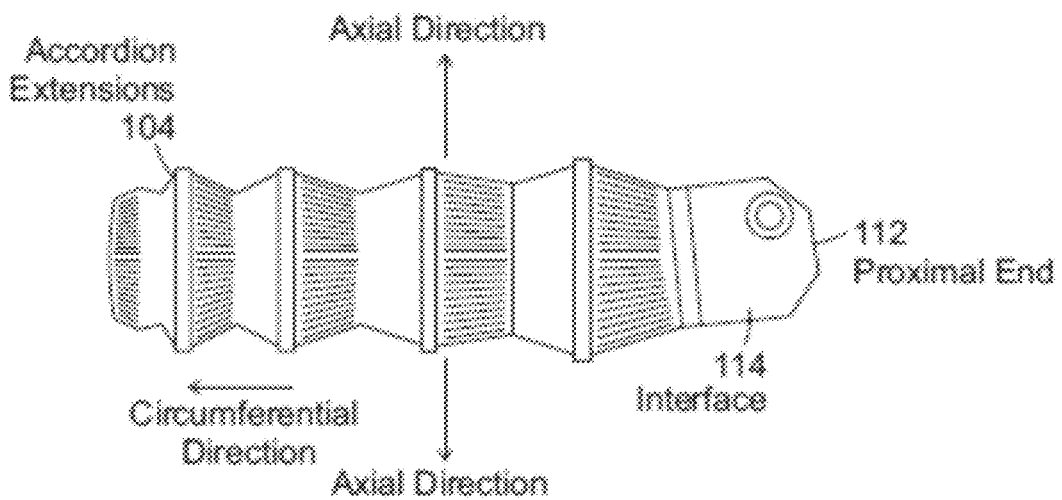
Figure 1C:
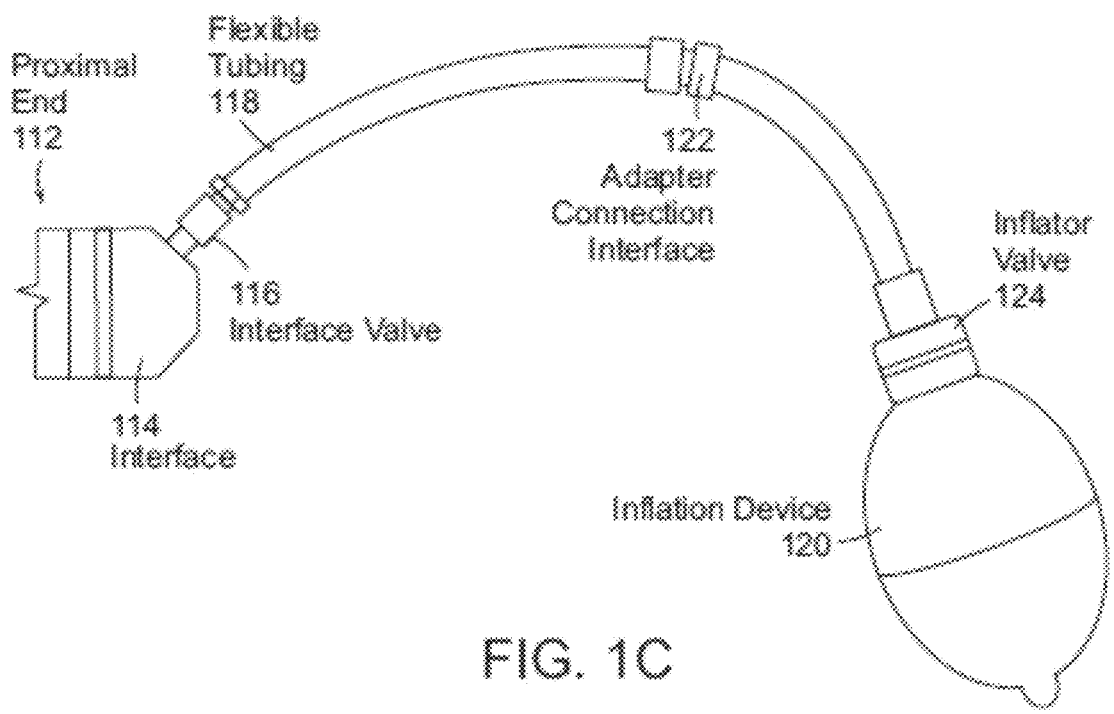
Figure 1D:
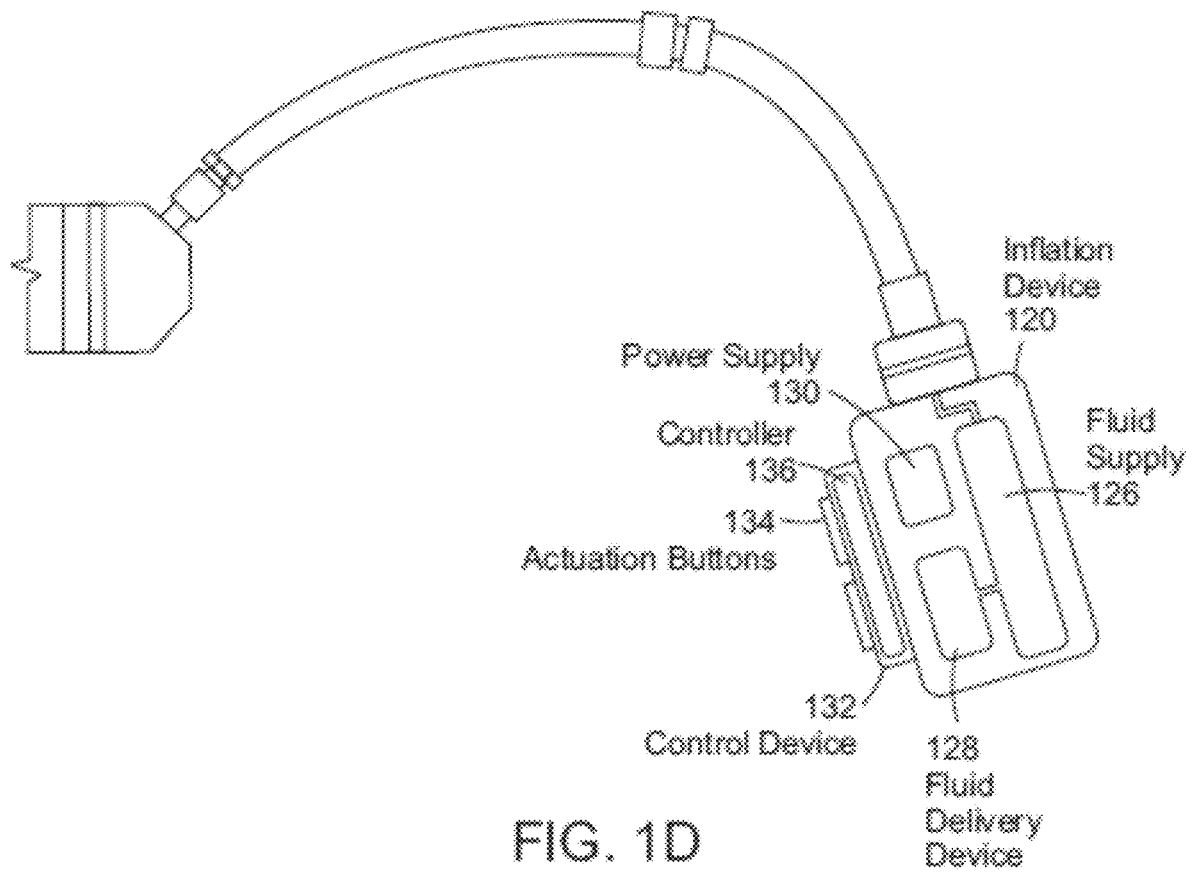

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning form the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

FIG. 1E depicts a soft robotic actuator 100 with multiple fingers, in which the gripper hub 202 is attached to a robot arm RA, in which the fluid supply for actuation is provided via an external fluid line 118. The fingers 100 are shown in a reverse curled position and curled in the direction 604.

Figures 1F, 1G:
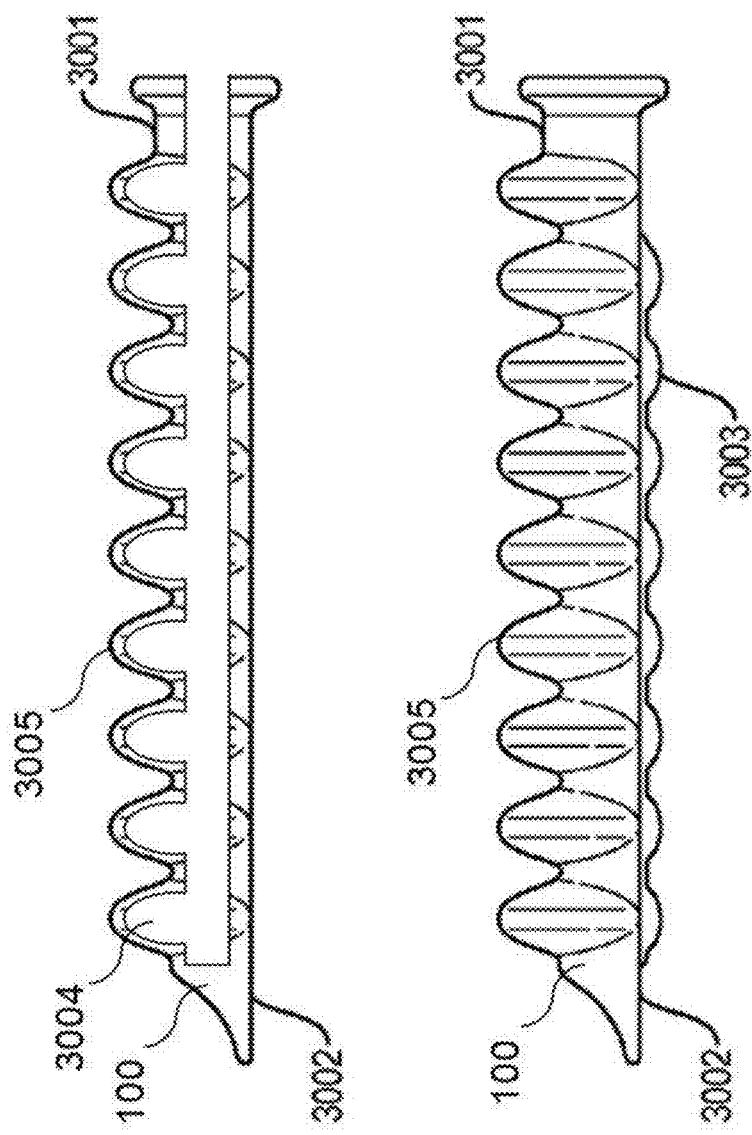

FIGS. 1F and 1G depict a soft robotic actuator finger 100 that may be used with any embodiment discussed herein. Each finger 100 or actuator 100 includes an elastomeric outer surface 3005 surrounding an internal void 3004, and the is configured to curl when an inflation fluid is supplied to the internal void 3004. A strain-limiting side 2003 resists extension while the expanding side 3001 includes bellows features to promote extension as well as contraction upon a change in fluid pressure, either extension or contraction causing curling in one direction or another. Reinforcing ribs 3003 constrain expansion and contraction to occur primarily along the curling direction, and also provide some texture or ridges for grasping.

FIGS. 1A-1G depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially attractive or field forces such as Bernouilli lift, suction force, vacuum force, magnetic, electrostatic, van der Waals', ultrasonic standing waves, laser tweezing), and contigutive (e.g., essentially adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality. Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary End-of-Arm-Tools

Exemplary embodiments described herein relate to end-of-arm tools (EOATs) having outlets located at the tips of robotic fingers (i.e., at the distal gripping tip of the robotic finger). The outlets allow a displacement fluid, such as compressed air, to be discharged from the finger tip. This capability may allow objects in tight or confined spaces to be moved away from other objects or from the sides of a container. Consequently, the target object can be placed into a better position or configuration so that the EOAT can achieve a more secure or otherwise better grasp on the target object.

Figure 2:
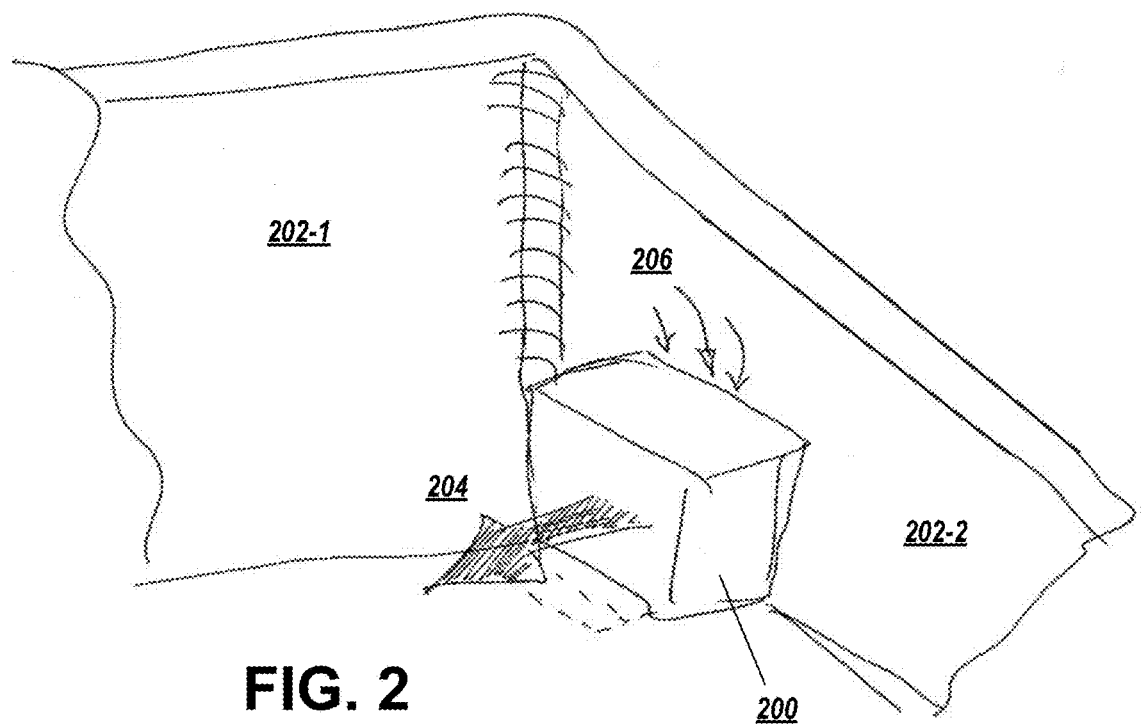
FIG. 2 depicts a situation in which an exemplary embodiment may be applied.

For example, FIG. 2 depicts a situation commonly presented to robotic grasping systems. A target object 200 is provided in a container. In this case, the target object 200 is pushed against the walls 202-1, 202-2 of the container. If a robotic end effector were to be lowered over the target object 200, one or more of the fingers of the robotic end effector would likely collide with at least one of the walls 202-1, 202-2 of the container.

It would be desirable, therefore, to move the target object 200 away from the wall 202-2 of the container, in the direction of the arrow 204. Conventional robotic systems do not include any efficient mechanism for achieving this relocation. For instance, a gripper could grasp the target object 200 from the accessible sides (e.g., the sides not directly facing the wall 202-1), but this may be particularly difficult if the target object 200 is in a corner (such that the gripper is potentially blocked by both walls 202-1 and 202-2).

A similar situation occurs when the target object 200 is in a crowded environment, with other objects (blocking objects) located in close proximity to the target object. In this case, it would be desirable to push the target object 200 away from the blocking objects (or vice versa).

Figure 3:
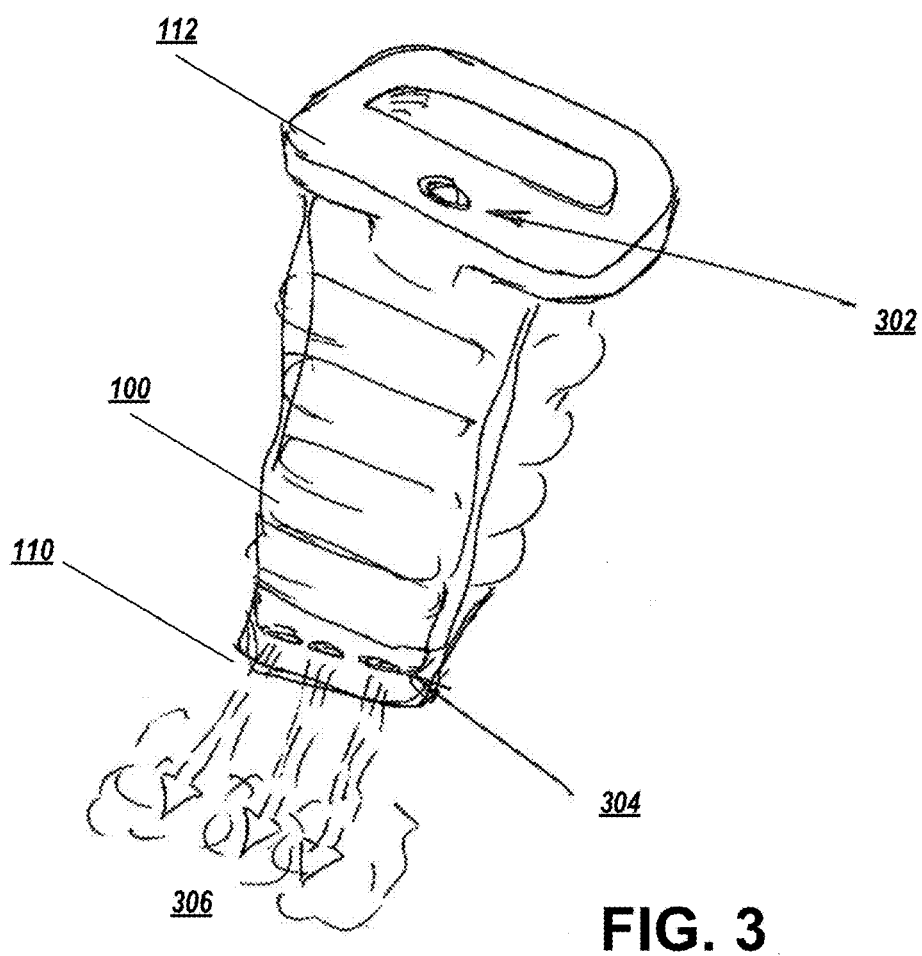
FIG. 3 depicts an exemplary soft robotic finger in accordance with exemplary embodiments.

Exemplary embodiments provide soft robotic actuators (or fingers) which allow a puff of displacement fluid to be expelled from the finger tips. The puff of displacement fluid may be used to displace the target object 200 away from an obstruction, such as the wall 202-2 or a blocking object. An example of such an actuator 100 is shown in FIG. 3.

The actuator 100 includes an inlet 302, which may be an opening or hole in the proximal end 112 of the actuator 100. The inlet 302 may be sized and configured to receive a displacement fluid. The displacement fluid used may depend on the particular application. For example, it may be convenient in some applications to use compressed air for the displacement fluid, since air is unlikely to damage a target object 200 and is likely to be readily available (e.g., if compressed air is also being used for the inflation fluid supplied to the actuator 100, it may be a relatively simple task to route the air from the compressor to the inlet 302). In other applications, different types of displacement fluids may be used, such as nitrogen, oxygen, carbon dioxide, etc. The displacement fluid may be selected based on the qualities of the target object 200, so as not to damage the target object. The displacement fluid may be the same as, or different than, the inflation fluid.

The actuator 100 may further include an outlet 304 at the distal end 110. The outlet allows a discharge 306 of the displacement fluid to be expelled from the distal end 110 of the actuator 100. The force of the discharge 306 may depend on the size and shape of the inlet 302, the size and shape of the outlet 304, the size of a channel between the inlet and the outlet, and the pressure of the air delivered to the inlet 302. Each of these parameters may be varied to achieve a desired amount of discharge force. In some embodiments, various aspects of the parameters may be controlled by a controller used to run the EOAT. For instance, the controller may modify an amount of fluid supplied by a compressor, may (fully or partially) open or close one or more valves along the route by which displacement fluid is supplied to the outlet 304, may change a size of the inlet 302 or outlet 304, etc.

Figure 4A:
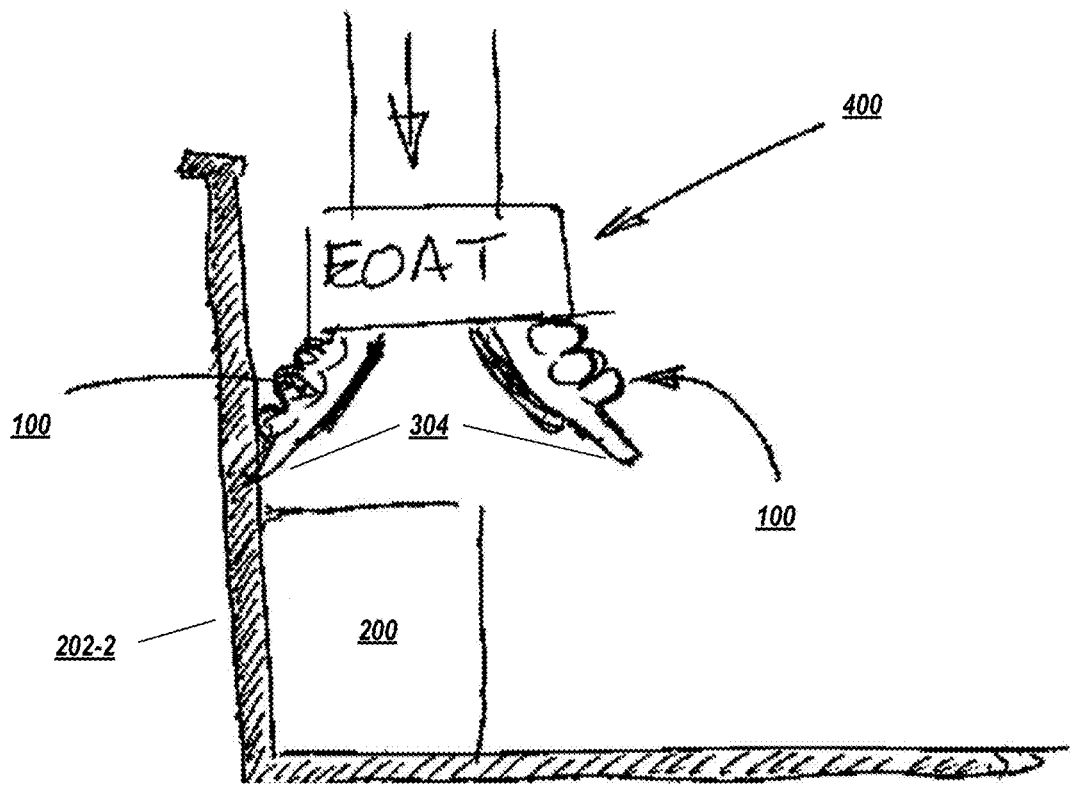
FIGS. 4A-4B depict an exemplary end effector in operation.
Figure 4B:
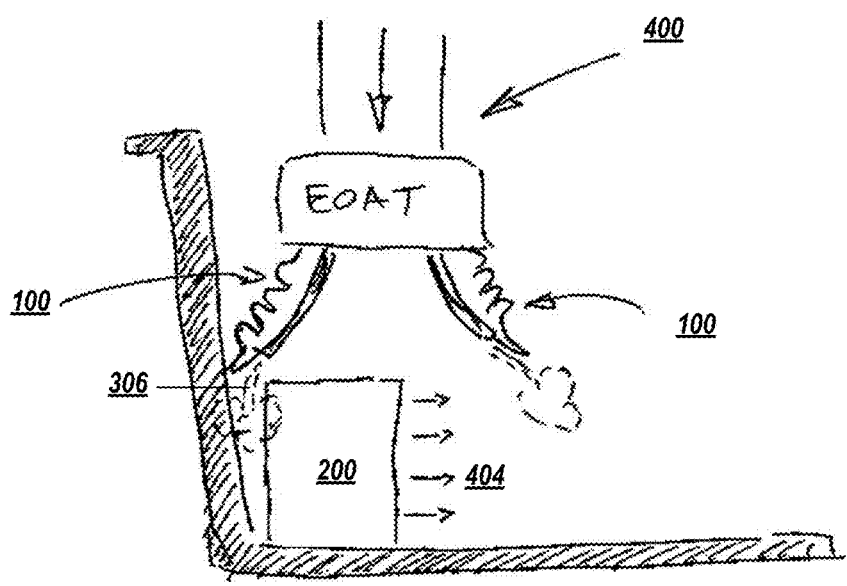

FIGS. 4A-4B show the exemplary actuator 100 in operation. The actuator 100 may be mounted on a robotic end-of-art-tool (EOAT) 400. The EOAT 400 may approach a target object 200 under the control of a controller associated with the EOAT 400. As the EOAT 400 approaches the target object 200, the actuators 100 may be in a neutral configuration or, as shown in FIG. 4A, may be reverse-inflated (e.g., by applying vacuum to the actuators 100). An advantage of reverse-inflating the actuators 100 at this stage is that, when the actuators 100 are reverse-curled, the outlet 304 of the actuators 100 may be presented more nearly perpendicularly to the target object 200, allowing the EOAT to direct the discharge 306 of the displacement fluid more directly between the target object 200 and the side of the container 202-2.

The EOAT 400 may be moved into a position so that the outlet 304 is positioned above an area where the target object 200 makes contact with (or is otherwise in close proximity to) the side of the container 202-2. The EOAT 400 may be moved into position by the controller based on the output of one or more sensors (such as cameras or range finders) mounted to the EOAT 400. When these sensors indicate that the EOAT 400 is in an appropriate position, the controller may transmit a signal to cause the discharge 306 of the displacement fluid. Because of the position of the EOAT 400, the discharge 306 of the displacement fluid causes the target object 200 to be displaced away from the side of the container 202-2 in the direction of the arrow 404, as shown in FIG. 4B.

Figure 5A:
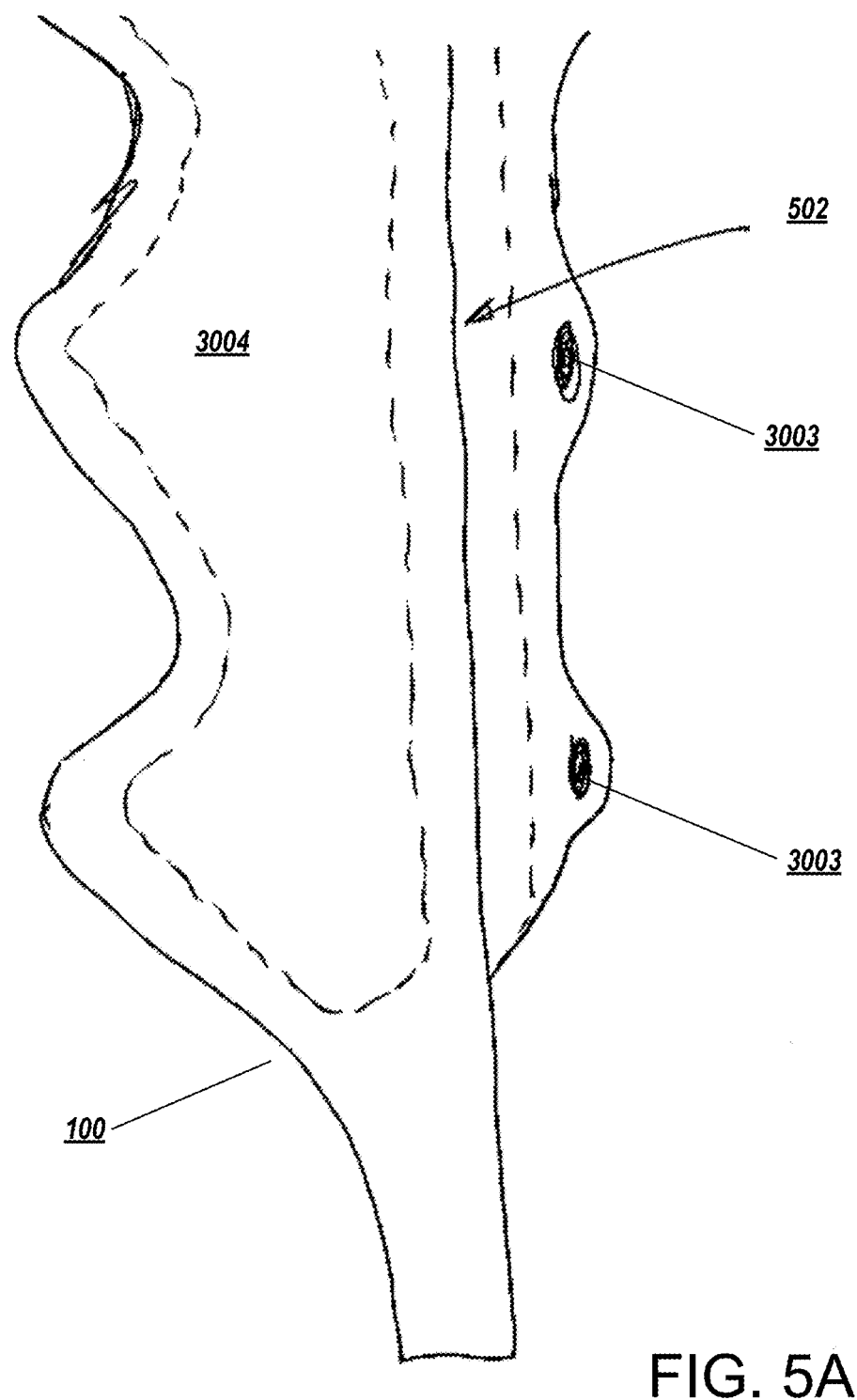
FIGS. 5A-5C are cross-sectional views showing an exemplary air channel provided in various configurations.
Figure 5C:
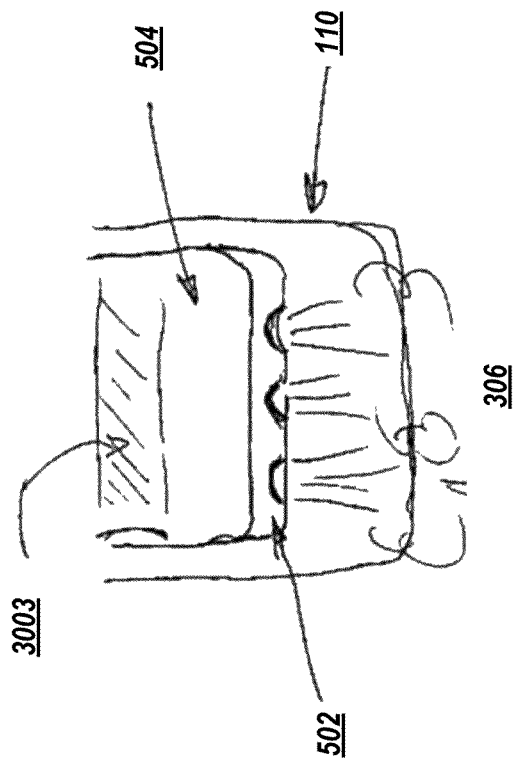
Figure 5B:
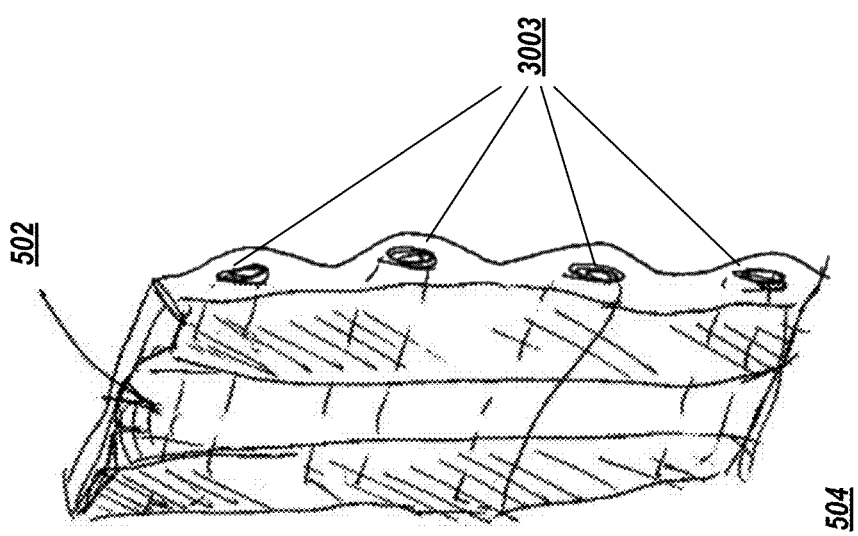

FIGS. 5A-5C are cross-sectional views depicting exemplary embodiments for routing the displacement fluid from the inlet to the outlet via a channel 502. As shown in FIG. 5A, and as previously discussed in connection with FIGS. 1F-1G, the actuator 100 may include an elastomeric molded layer surrounding an inner void 3004. A strain limiting layer may incorporate one or more slats 3003. The strain limiting layer may be integral with the rest of the actuator 100, or may be provided separately, as a slat cover 504 (see FIG. 5B).

It may be important that the channel 502 not pierce the inner void 3004, and that it not interfere with the operation of the strain limiting layer (e.g., by piercing the openings for the slats 3003. In some embodiments, therefore, the channel 502 may be a channel within the strain limiting layer.

In other embodiments, the channel 502 may be a channel within the elastomeric molded layer surrounding the inner void 3004. Still further, in some embodiments, the channel 502 may be a channel that extends between the elastomeric molded layer surrounding the inner void 3004 and the strain limiting layer.

In either embodiment, the channel 502 may be an opening created during the process of molding the strain limiting layer, and/or may be a tube or other device inserted through the strain limiting layer. The channel 502 may be sized and configured to remain relatively flexible and in an open configuration even when the actuator 100 bends.

FIG. 5B depicts an example in which the channel 502 extends in a central region of the slat cover 504 forming the strain limiting layer. The channel 504 is configured to extend behind the slats 3003 and, as shown in FIG. 5C, ends at a set of openings forming the outlet through which a discharge 306 of the displacement fluid may be sent. The number, size, configuration etc. of the openings may be chosen depending on the amount and configuration of air desired for the discharge 306. In some embodiments (discussed later in connection with FIGS. 8A-8B), the openings may be pores in a porous surface forming the outlet, in order to provide for a proximity sensing capability.

Figure 6A:
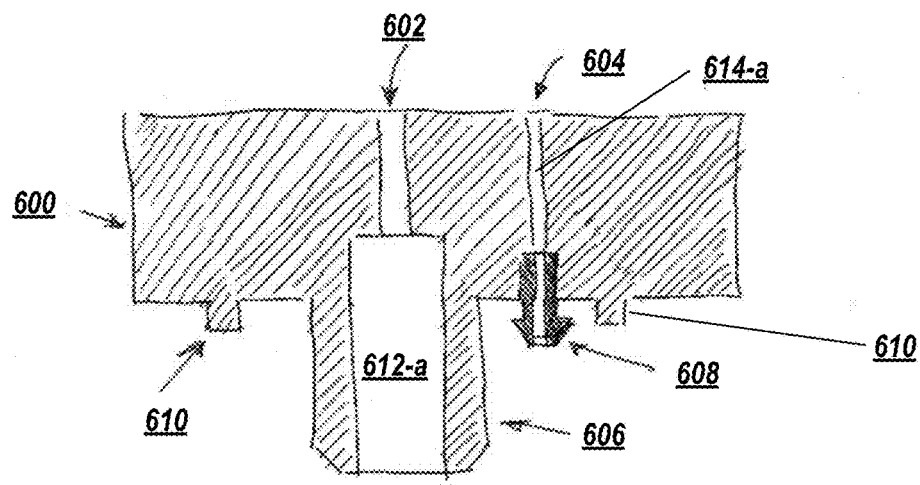
FIGS. 6A-6B depict an exemplary manifold for connecting a soft robotic finger to a robotic hub.
Figure 6B:
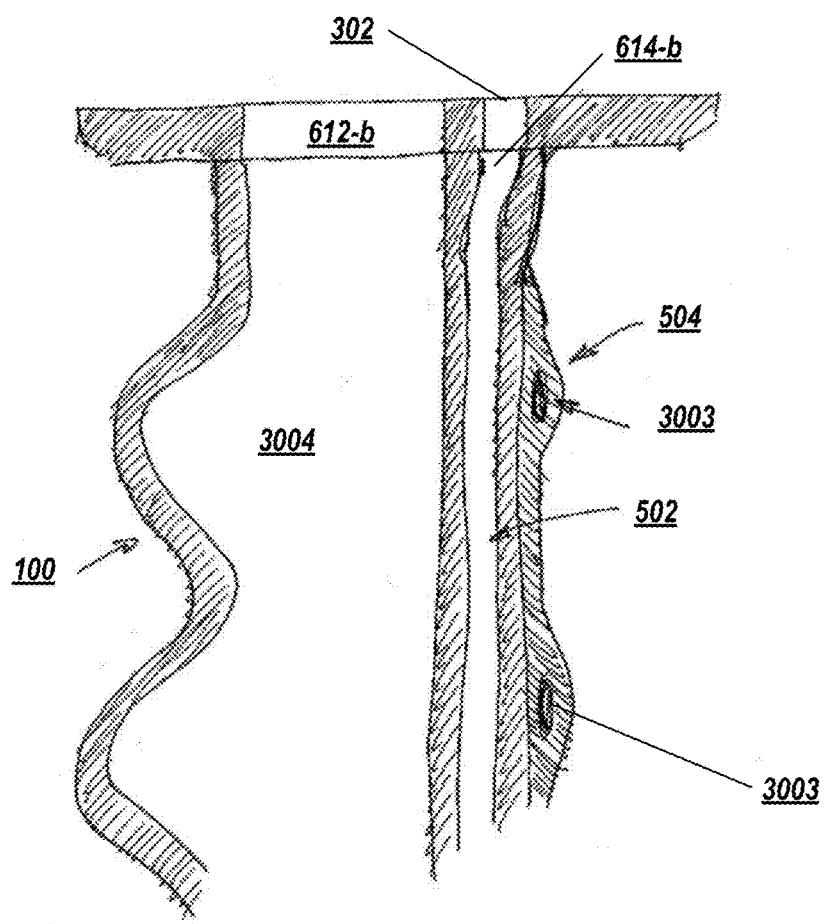

Turning to FIGS. 6A-6B, the actuator 100 including the opening 302 may connect to a hub or interface of the EOAT 400 via a manifold 600. The manifold 600 may be integral with the EOAT 400 hub or interface, or may be a separate structure that is attached to the hub or interface.

The manifold 600 includes an inlet 602 for receiving an inflation fluid. The inlet 602 connects to a manifold inflation fluid passage 612-a, which is configured to mate with and be in fluid communication with an actuator inflation fluid passage 612-b that connects to the reservoir or void 3004 of the actuator 100.

Similarly, the manifold 600 includes an inlet 604 for receiving a displacement fluid. The inlet 604 connects to a manifold displacement fluid passage 614-a, which is configured to mate with and be in fluid communication with an actuator displacement fluid passage 614-b that connects to the channel 502.

The manifold 600 includes an extension 606 in the form of a "D"-shaped finger mount. The extension 606 may be configured to extend into the actuator inflation fluid passage 612-b and may be sized and shaped to hold the actuator 100 in place (e.g., through friction and/or barbs on the extension 606) via the inner walls of the actuator 100 (i.e., the walls surrounding the void 3004).

In addition to sealing along the inner surface of the void 3004, the manifold 600 may include one or more protrusions 610 forming a knife-edge seal. The protrusions 610 may push into the elastomeric material at the base of the actuator 100 and thereby prevent inflation fluid from leaking out of the actuator void 3004.

The manifold 600 may further include a barbed interface 608 for inserting into the actuator displacement fluid passage 614-b. The barbed interface 608 may be sized and shaped to fit into the passage 614-b and, by action of friction and the resistance of the barbs to being withdrawn, secure the manifold 600 to the passage 614-b and provide a fluid-tight seal that prevents the displacement fluid from escaping and/or from leaking into the inflation fluid flow path (and vice versa).

Although embodiments have been described above with respect to a displacement fluid being discharged through the distal tip of the finger, the present invention is not limited to discharging the displacement fluid at this location. For instance, the displacement fluid may be discharged from a central or proximal location by moving the outlet, or may be dispersed along the outer surface of the actuator.

Figure 7B:
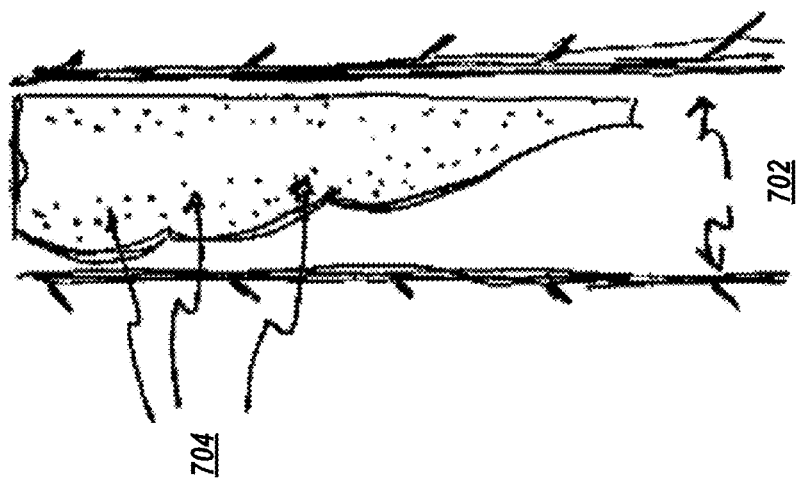
FIGS. 7A-7B depict an exemplary embodiment in which lubrication fluid is expelled through a porous surface in the robotic finger.
Figure 7A:
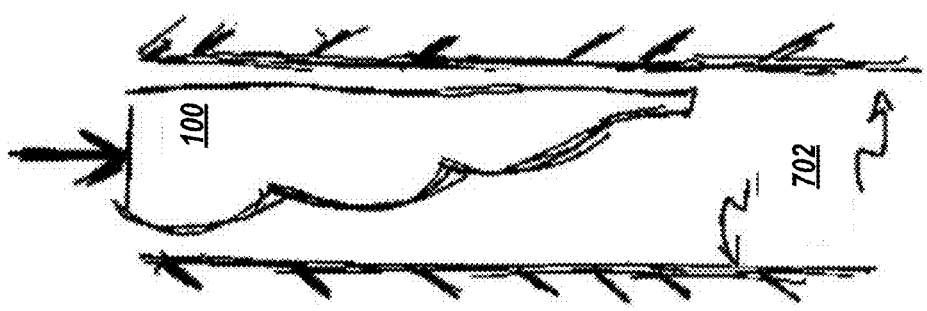

This concept may be taken a step further, so that a lubrication fluid is supplied to an outer porous surface of the actuator, as shown in FIGS. 7A and 7B. In this example, the actuator 100 is inserted into a relatively confined space defined by walls 702, and then withdrawn. The friction of the actuator outer surface on the walls 702 may cause the actuator to become stuck. In this example, the channel 502 may provide a lubrication fluid (which may be the same as or different than the inflation fluid and/or the displacement fluid) to an outer porous surface 704 of the actuator 100. The lubrication fluid may be expelled through small holes in the porous surface 704 and coat the actuator 100 and/or the walls 702. In this manner, friction may be reduced and the actuator 100 may be more easily withdrawn from the confined space.

This embodiment may be used separately or in conjunction with the embodiments described above. The lubrication fluid may be selected based on the application, and may be (for example) water, oil, or another engineering fluid lubricant.

Figure 8B:
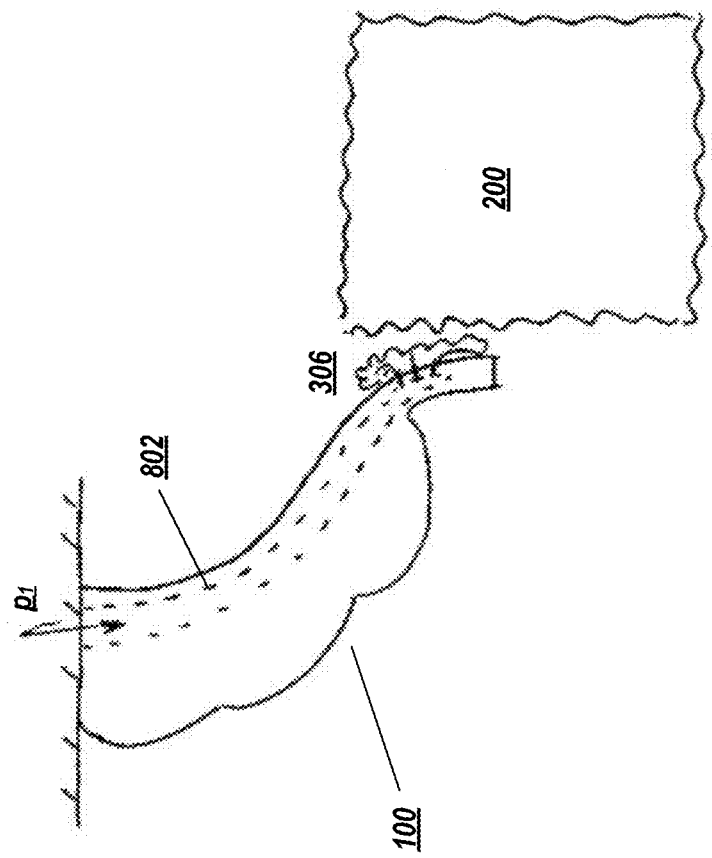
FIGS. 8A-8B depict an exemplary embodiment in which pressure in a fluid channel is measured to serve as a proximity detector.
Figure 8A:
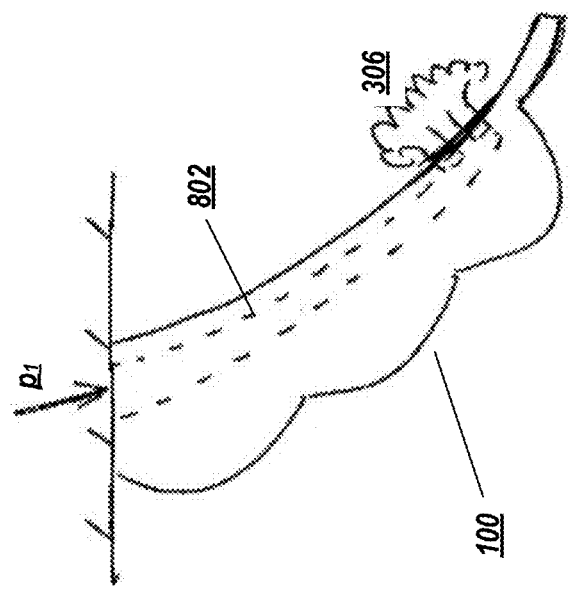

In another example, the porous surface may be located at the tip of the actuator, in order to provide for a contact or proximity sensor, as shown in FIGS. 8A-8B. In this example, a pressurized fluid (which may be the same as or different than the inflation or displacement fluids) is provided to a channel 802 (which may be the same as or different than the channel 502 for the displacement fluid) at a first pressure $p_1$ (where $p_1$ > atmospheric pressure). The pressurized fluid may be expelled through the outlet 306, which in this case may be a porous outlet that limits the rate at which the fluid is expelled. A steady-state flow rate may be determined, which represents the flow rate that maintains the first pressure $p_1$ in the channel 802. The pressure in the channel 802 may be measured, e.g., by an embedded pressure sensor, by measuring a pressure of the pressurized fluid at the outlet, by measuring an upstream pressure, or in any other suitable way.

When the tip of the actuator 100 is moved into close proximity to a target object 200 (see FIG. 8B), the outlet becomes blocked or choked, which restricts the discharge 306 of the pressurized fluid. Accordingly, the pressure in the channel 802 will rise to a new pressure $p_2$, and the flow rate required to maintain the pressure in the channel 802 at the first pressure $p_1$ will drop. The change in pressure or the change in flow rate may be detected by a controller and may serve as a signal that the tip of the actuator 100 has made contact with, or is in close proximity to, the target object 200.

Grasping Method

Figure 9:
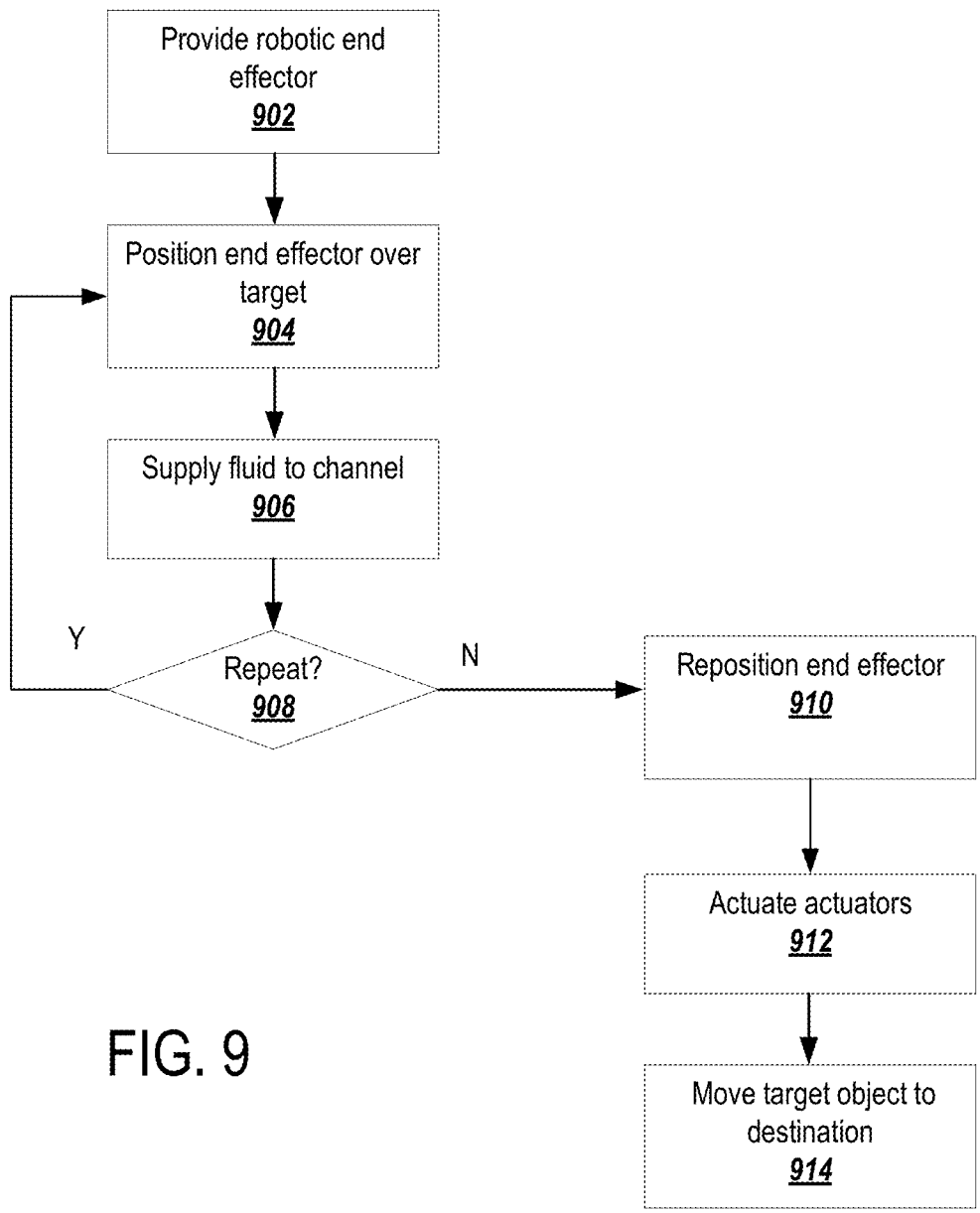
FIG. 9 is a flowchart describing an exemplary grasping technique in accordance with exemplary embodiments.

FIG. 9 describes a procedure for deploying and using an end effector as described above.

At block 902, a robotic end effector may be provided and affixed to a robotic system (e.g., a robotic arm). The robotic end effector may be a robotic end effector as depicted and described herein.

At block 904, the system may position the end effector over the target to be grasped. A sensor (mounted on the end effector or elsewhere) may detect that the target object is in close proximity to another object or a container wall. This detection may trigger further processing to move the target object away from the blocking object or wall. Accordingly, the end effector may be moved so as to position an outlet at the distal end of an actuator of the end effector in a position configured to direct displacement fluid at an interface between the target object and the blocking object/container wall.

The particular location at which the outlet is directed may optionally be selected based on a desired direction and amount of displacement of the target object. In some embodiments, it may be desirable to rotate an object (separate from or in combination with displacing the object), and the outlet may be positioned at a location and facing a direction calculated to cause a target amount of rotation of the object.

At block 906, when the outlet is properly positioned, a controller may cause displacement fluid to be supplied to the displacement fluid inlet. This may involve, for example, transmitting a signal to a compressor or other device that supplies the displacement fluid. As a result, the displacement fluid may be expelled from the outlet, causing the target object to be displaced and/or rotated.

It is possible that the first discharge of displacement fluid will not have the intended effect. Accordingly, at block 908 the process described in blocks 904-906 may optionally be repeated if the sensor guiding the end effector indicates that the target object has not been moved to a target location or into a target configuration.

When the target object has been moved to the target location or configuration, processing may proceed to block 910 and the end effector may be repositioned into a grasping configuration. The grasping configuration may be a configuration of the end effector that allows the target object to be grasped by the actuators. The grasping configuration may be the same as, or different than, the configuration of the end effector achieved in block 904. Optionally, the system may begin to expel pressurized fluid from the distal end of the actuator and may use the pressurized fluid as a proximity or contact sensor, as described above in connection with FIGS. 8A-8B.

At block 912, the system may actuate the actuators 100 to cause them to curl and grasp the target object. Depending on the grasp mode selected, the degree of curl may be controlled by a controller by adding or subtracting more or less inflation fluid to the actuators 100 (e.g., with more curl resulting in a firmer grasp for relatively hard objects, or less curl resulting in a looser grasp for relatively fragile objects). In some embodiments, the actuators 100 may be maintained in a neutral or even negatively-inflated position, and may be pushed into the target object through action of the linear actuators.

Having thus secured the target object in the grip of the EOAT, at block 914 the EOAT may be translated and/or rotated to move the target object to a desired destination or configuration.

The above-described method may be embodied as instructions or logic stored on a non-transitory computer-readable medium. When executed, the instructions or logic may cause a processor circuit to perform the above-described method using a robotic system.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including EOAT 202 and the like. Bendable members may include soft robotic members such as soft robotic actuators 100.

We claim:

1. A soft robotic end effector comprising:
    a gripper hub;
    a soft robotic finger supported by the hub, the soft robotic finger including an elastomeric outer surface surrounding an internal void, and configured to curl when a pressure change occurs within the internal void, wherein the soft robotic finger comprises:
        an inlet located at a proximal end of the soft robotic finger,
        an outlet located at a distal end of the soft robotic finger, and
        a channel connecting the inlet to the outlet;
    a sensor configured to detect when a target object is located in close proximity to a blocking object; and
    a controller configured to provide a displacement fluid to the inlet to cause a discharge of the displacement fluid through the outlet, wherein:
    the outlet is porous, and the controller is configured to measure a pressure in the channel and identify that a distal end of the soft robotic finger is in proximity to the target object based on a change in the pressure.

2. The end effector of claim 1, wherein the displacement fluid is compressed air.

3. The end effector of claim 1, further comprising a strain limiting layer on a radially interior surface of the soft robotic finger, the strain limiting layer comprising a plurality of rigid slats, wherein the channel is embedded in the strain limiting layer.

4. The end effector of claim 1, wherein the channel is embedded in the elastomeric outer surface of the soft robotic finger.

5. The end effector of claim 1, wherein the controller is configured to approach a target object based on an output of the sensor and apply the discharge of the displacement fluid to displace the target object.

6. The end effector of claim 1, wherein the gripper hub is a manifold comprising a first fluid flow path for supplying an inflation fluid to the soft robotic finger, and a second fluid flow path for supplying the displacement fluid to the inlet.

7. The end effector of claim 6, wherein the manifold further comprises a barbed connector configured to mate with the inlet.

8. The end effector of claim 6, wherein the manifold further comprises a flange configured to capture and secure the soft robotic finger.

9. The end effector of claim 6, wherein the first fluid flow path connects to the internal void of the soft robotic finger.

10. A method comprising:
    providing the soft robotic end effector of claim 1; and
    causing the controller to discharge the displacement fluid through the outlet.

11. The method of claim 10, wherein the controller transmits a signal to a compressor to cause the compressor to supply compressed air as the displacement fluid.

12. The method of claim 10, further comprising flowing the displacement fluid through a strain limiting layer on a radially interior surface of the soft robotic finger, the strain limiting layer comprising a plurality of rigid slats, wherein the channel is embedded in the strain limiting layer.

13. The method of claim 10, further comprising flowing the displacement fluid through the elastomeric outer surface of the soft robotic finger.

14. The method of claim 10, further comprising approaching a target object with the soft robotic end effector based on an output of the sensor.

15. The method of claim 10, further comprising attaching the soft robotic finger to a manifold.

16. The method of claim 10, wherein the gripper hub is a manifold comprising a first fluid flow path and a second fluid flow path, and further comprising supplying an inflation fluid to the soft robotic finger via the first fluid flow path, and supplying the displacement fluid to the inlet via the second fluid flow path.

17. The method of claim 16, wherein the manifold further comprises a barbed connector configured to mate with the inlet, and further comprising attaching the inlet to the barbed connector.

18. The method of claim 16, wherein the manifold further comprises a flange, and further comprising securing the soft robotic finger to the flange.

* * * * *